(12) United States Patent
Ikeda et al.

(10) Patent No.: US 11,422,300 B2
(45) Date of Patent: Aug. 23, 2022

(54) LIGHT EMITTING DISPLAY DEVICE INCLUDING MICROPROJECTION GROUP AND PLURALITY OF MICRORECESSES, METHOD FOR PRODUCING LIGHT GUIDE PLATE AND GAME MACHINE

(71) Applicant: OMRON Corporation, Kyoto (JP)

(72) Inventors: Shogo Ikeda, Kusatsu (JP); Junya Fujita, Ichinomiya (JP); Jun Kishimoto, Ichinomiya (JP); Masanori Mori, Ichinomiya (JP); Mitsuru Okuda, Ichinomiya (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 17/293,055

(22) PCT Filed: Nov. 8, 2019

(86) PCT No.: PCT/JP2019/043975
§ 371 (c)(1),
(2) Date: May 12, 2021

(87) PCT Pub. No.: WO2020/137192
PCT Pub. Date: Jul. 2, 2020

(65) Prior Publication Data
US 2021/0396926 A1 Dec. 23, 2021

(30) Foreign Application Priority Data
Dec. 27, 2018 (JP) .............................. JP2018-246022

(51) Int. Cl.
*F21V 8/00* (2006.01)
*A63F 7/02* (2006.01)
*C25D 1/10* (2006.01)

(52) U.S. Cl.
CPC .............. *G02B 6/0088* (2013.01); *C25D 1/10* (2013.01); *G02B 6/0036* (2013.01);
(Continued)

(58) Field of Classification Search
CPC .................................................... G02B 6/0076
See application file for complete search history.

(56) References Cited

U.S. PATENT DOCUMENTS

| | | | |
|---|---|---|---|
| 2009/0180282 A1* | 7/2009 | Aylward ........... | G02F 1/133605 362/245 |
| 2011/0194167 A1 | 8/2011 | Jackson et al. | |

(Continued)

FOREIGN PATENT DOCUMENTS

| | | |
|---|---|---|
| JP | 2003-22585 A | 1/2003 |
| JP | 2008-275916 A | 11/2008 |

(Continued)

OTHER PUBLICATIONS

An English translation of the International Search Report ("ISR") of PCT/JP2019/043975 dated Jan. 21, 2020.

(Continued)

Primary Examiner — Keith G. Delahoussaye
(74) Attorney, Agent, or Firm — Metrolex IP Law Group, PLLC

(57) ABSTRACT

A first light guide plate and a second light guide plate are arranged facing each other. A microprojection group comprising a plurality of microprojections is arranged in the visual recognition region of the surface facing the first light guide plate in the second light guide plate. The plurality of microprojections have a height and arrangement that ensure a distance where interference fringes are not visually recognized between the first light guide plate and the second light guide plate in contact with the second light guide plate. The microprojection group and the dimples configuring a (Continued)

design part formed on the second light guide plate are formed on an identical surface.

20 Claims, 10 Drawing Sheets

(52) U.S. Cl.
CPC ......... *G02B 6/0038* (2013.01); *G02B 6/0065* (2013.01); *G02B 6/0076* (2013.01); *A63F 7/022* (2013.01)

(56) References Cited

U.S. PATENT DOCUMENTS

2013/0033901 A1* 2/2013 Nishitani ............. G02B 6/0036
  362/613
2016/0306098 A1* 10/2016 Fujita .................. G02B 6/0036
2018/0031882 A1* 2/2018 Ota ..................... H01L 51/0096
2019/0018183 A1* 1/2019 Ochi .................... G02B 6/0061

FOREIGN PATENT DOCUMENTS

JP          2010-51348 A      3/2010
WO          2008/069324 A1    6/2008

OTHER PUBLICATIONS

The Written Opinion("WO") of PCT/JP2019/043975 dated Jan. 21, 2020.

* cited by examiner

LIGHT EMITTING DISPLAY DEVICE INCLUDING MICROPROJECTION GROUP AND PLURALITY OF MICRORECESSES, METHOD FOR PRODUCING LIGHT GUIDE PLATE AND GAME MACHINE

TECHNICAL FIELD

The disclosure relates to a light emitting display device using a light guide plate, a method for manufacturing the light guide plate, and a game machine.

BACKGROUND ART

In game machines such as pachinko machines and pachis-lot machines installed in amusement parks, an image display device using a liquid crystal panel or an organic EL panel or a light emitting display device using a light guide plate is used in order to enhance decorative effect and directing effect. An image display device and a light emitting display device are superimposed on each other in a game area in some cases.

The image display device can display various images on the basis of an image signal. On the other hand, although the light emitting display device cannot change the displayed design, the light emitting display device can display with an impact by emitting the pattern with high brightness in conjunction with on and off of light sources. The light emitting display device is also applied to a guidance apparatus, a signboard apparatus, and the like.

In some light emitting display devices, a plurality of light guide plates is stacked. In a case where a plurality of light guide plates is stacked, when the light guide plates contact each other, rainbow-colored interference fringes called a Newton ring occur at a contact part. Thus, an arrangement is made to secure a clearance between the light guide plates. For example, Patent Document 1 discloses a configuration in which a spacer is disposed between light guide plates to secure a clearance.

Patent Document 1: Japanese Unexamined Patent Publication No. 2010-051348

SUMMARY

However, in the configuration disclosed in Patent Document 1, the spacer is interposed between the light guide plates and a screw is passed through the light guide plates to fix the light guide plates. Therefore, in a part provided with the spacer, a progress of light inside the light guide plates is hindered by the screw, and this hinders effect of the light emission display.

Further, in the configuration disclosed in Patent Document 1, the spacer is disposed at an end of the light guide plates to avoid an area that can be visually recognized by a player (visual recognition region) such that the spacer is difficult for the player to visually recognize. Thus, there is nothing that holds the clearance between the light guide plates in a center of the light guide plates where the visual recognition region is located. In this case, as long as a separation distance between the light guide plates is sufficiently secured, there is no problem even when the light guide plates are warped. However, in a case where the separation distance is insufficient, when the light guide plates are warped, the light guide plates come into contact with each other at the center where the visual recognition region is located, and interference fringes occur. Note that the interference fringes occur when the light guide plates come close to each other beyond a predetermined distance with a wavelength of visible light as one parameter although the light guide plates do not contact each other. Hereinafter, this predetermined distance will be referred to as an occurrence distance. The light guide plates, which are resin molded products including acrylic resin or the like as a material, are difficult to avoid warp due to an influence of humidity and heat.

Moreover, such interference fringes occur not only between the light guide plates but also occur when the light emitting display device is disposed to face and come close to a glass plate or the like covering a front surface of the image display device and the game area in a case where the light guide plates are warped and the light guide plates come close to the liquid crystal panel or the glass plate of the image display device beyond the occurrence distance.

A light emitting display device, a method for manufacturing a light guide plate, and a game machine according to one or more embodiments are provided that may reliably prevent interference fringes from being visually recognized in a visual recognition region even if the light guide plate is warped and that may be manufactured at low cost.

A light emitting display device according to one or more embodiments may include a light guide plate provided with a plurality of microrecesses that emits light supplied within the light guide plate to outside, a light source unit configured to supply light to the light guide plate, and a microprojection group including a plurality of microprojections provided in a visual recognition region of the light guide plate, the microprojection group having a height and an arrangement that ensure such a distance that interference fringes are not visually recognized in a case where the microprojection group is in contact with an object disposed to face the light guide plate and the object has light transmission property between the light guide plate and the object, in which the microprojection group and the plurality of microrecesses are disposed on an identical surface.

A method for manufacturing a light guide plate according to one or more embodiments may include, the light guide plate being provided with, on one surface of the light guide plate, a plurality of microrecesses that emits light supplied within the light guide plate to outside and a microprojection group including a plurality of microprojections provided in a visual recognition region of the light guide plate, the microprojection group having a height and an arrangement that ensure such a distance that interference fringes are not visually recognized in a case where the microprojection group is in contact with an object disposed to face the light guide plate and the object has light transmission property between the light guide plate and the object, the method including manufacturing a stamper body by electroforming with a prototype provided with the microrecesses in a first step, and processing recesses to be the microprojections, in a second step, on a surface of the stamper body that has been produced in the first step, the surface being provided with inverted products of the microrecesses.

A light emitting display device and a game machine according to one or more embodiments may be capable of reliably preventing interference fringes from being visually recognized in a visual recognition region even if a light guide plate is warped.

DETAILED DESCRIPTION

Hereinafter, a light emitting display device using a light guide plate, a method for manufacturing the light guide plate, and a game machine according to one or more embodiments are described with reference to the drawings.

§ 1 APPLICATION EXAMPLE

First, with reference to FIGS. 1 and 2, a light guide plate unit 10 mounted on a game machine 1 as a pachinko machine will be described as an example of a light emitting display device. As shown in FIG. 2, the light guide plate unit 10 is superimposed on a game area 2 through which game balls pass as one of effect devices. An image display device 3 is provided behind the game area such that an image of the image display device 3 can be visually recognized via the light guide plate unit 10.

Figure 1:
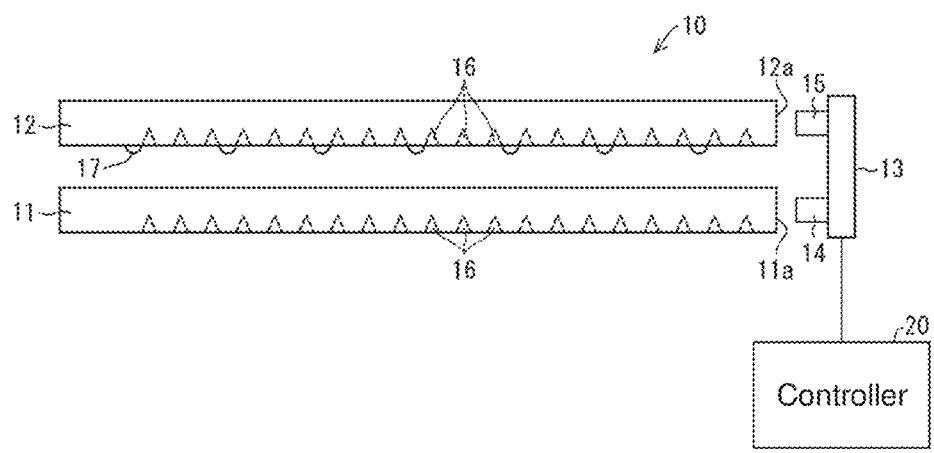
FIG. 1 is a schematic diagram illustrating a configuration of a light guide plate unit according to a first embodiment.
Figure 2:
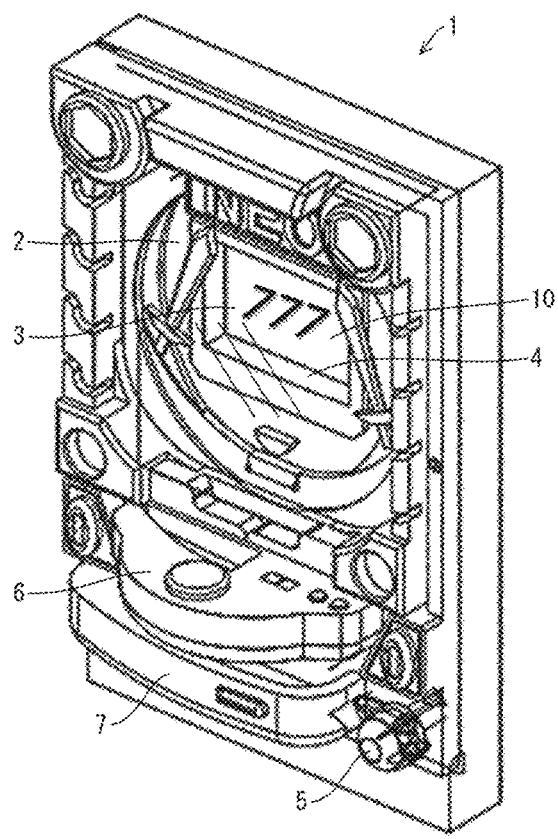
FIG. 2 is a perspective view diagram illustrating a configuration of a game machine provided with a light guide plate unit.

As shown in FIG. 1, the light guide plate unit 10 includes a first light guide plate 11 and a second light guide plate 12, which are a plurality of light guide plates disposed to be superimposed on each other in a plan view, a first light source unit 14, and a second light source unit 15. The first light guide plate 11 and the second light guide plate 12 have a design part with dimples 16 which are microrecesses as a light emitter that emits light supplied from the first light source unit 14 and the second light source unit 15 to outside. The light guide plate unit 10 emits light from the first light guide plate 11 and the second light guide plate 12 introduced inside the first light guide plate 11 and the second light guide plate 12 from the design part to display light emission.

In such a configuration, in a case where both or either of the first light guide plate 11 and/or the second light guide plate 12 are warped, and the first light guide plate 11 and the second light guide plate 12 contact each other or come close to each other at equal to or less than the occurrence distance, interference fringes occur. The occurrence of interference fringes in the visual recognition region reduces display effect of the light guide plate unit 10 and the image display device 3, the display effect being visually recognized through the light guide plate unit 10.

Thus, in order to prevent occurrence of such interference fringes, in the light guide plate unit 10 according to the embodiment, a microprojection group including a plurality of microprojections 17 is provided in the visual recognition region of a surface of at least one of the first light guide plate 11 or the second light guide plate 12, which is the second light guide plate 12 facing the first light guide plate 11 in an example shown in FIG. 1. The microprojection group has a height and an arrangement that secures a distance so as not to contact the first light guide plate 11 facing the microprojection group and cause interference fringes to be visually recognized between the first light guide plate 11 and the second light guide plate 12.

This configuration can physically prevent the first light guide plate 11 and the second light guide plate 12, in the visual recognition region, from approaching to equal to or less than the occurrence distance in which interference fringes occur even if both or either of the first light guide plate 11 and/or the second light guide plate 12 are warped. It is therefore possible to reliably prevent interference fringes from being visually recognized in the visual recognition region. Further, the first light guide plate 11 and the second light guide plate 12 do not contact each other, and thus light leakage from a contact surface can be prevented. In addition, the microprojections 17 are provided, and thus the light guide plates are released favorably when molded. Moreover, in the second light guide plate 12, the dimples 16 and the microprojections 17 are formed on the same surface, which produces further effect that a manufacturing cost can be suppressed low.

§ 2 CONFIGURATION EXAMPLE

First Embodiment

An embodiment of the disclosure will be described below with reference to FIGS. 1 to 14.

(1. Outline of Game Machine 1)

The configuration of the game machine 1 provided with the light guide plate unit 10 which is the light emitting display device according to the embodiment will be described with reference to FIG. 2. FIG. 2 is a perspective view of the configuration of the game machine 1 provided with the light guide plate unit 10. In the embodiment, an application to a pachinko machine as an example of a game machine is described, but an application target of the disclosure is not limited to this. The disclosure can be applied to, for example, game machines such as pachislot machines and various game devices, guidance apparatuses, and signboard apparatuses.

As shown in FIG. 2, the game machine 1 according to the embodiment includes the game area 2, the image display device 3, the light guide plate unit (light emitting display device) 10, a glass plate 4, a handle 5, an upper tray 6, a lower tray 7, and the like. The game area 2 is an area in which game balls (game medium) launched by the handle 5 move. The glass plate 4 is installed on a front surface of the game machine 1 and covers the game area 2. The handle 5 is a device for launching game balls. When the game machine maintains a state with the handle 5 twisted, the game balls are continuously fired and launched into the game area 2. The upper tray 6 stores game balls acquired by the game, and the lower tray 7 stores surplus game balls that cannot be stored in the upper tray 6.

The image display device 3 and the light guide plate unit 10 are superimposed on the game area 2. The image display device 3 is provided behind the game area 2, and the game balls pass in front of the display screen of the image display device 3. The image display device 3 includes a liquid crystal panel, an organic EL panel, and the like, performs effect by displaying an image on the basis of an image signal, and also displays operation guide information and the like.

The light guide plate unit 10 is disposed between the image display device 3 and the glass plate 4. In the embodiment, the game balls pass behind the light guide plate unit 10. Note that the game balls can be configured to pass in front of the light guide plate unit 10. Although the details will be described later, the light guide plate unit 10 includes a light guide plate having a design part formed at a light emitter and a light source unit, and performs light emitting display in which the light of the light source unit introduced inside the light guide plate is reflected at the design part and emitted to the outside, and the design part shines in a color of the light source. The light guide plate unit 10 causes the design part to emit light when, for example, a game ball enters a winning opening provided in the game area 2.

(2. Configuration of Light Guide Plate Unit 10)

Figure 3:
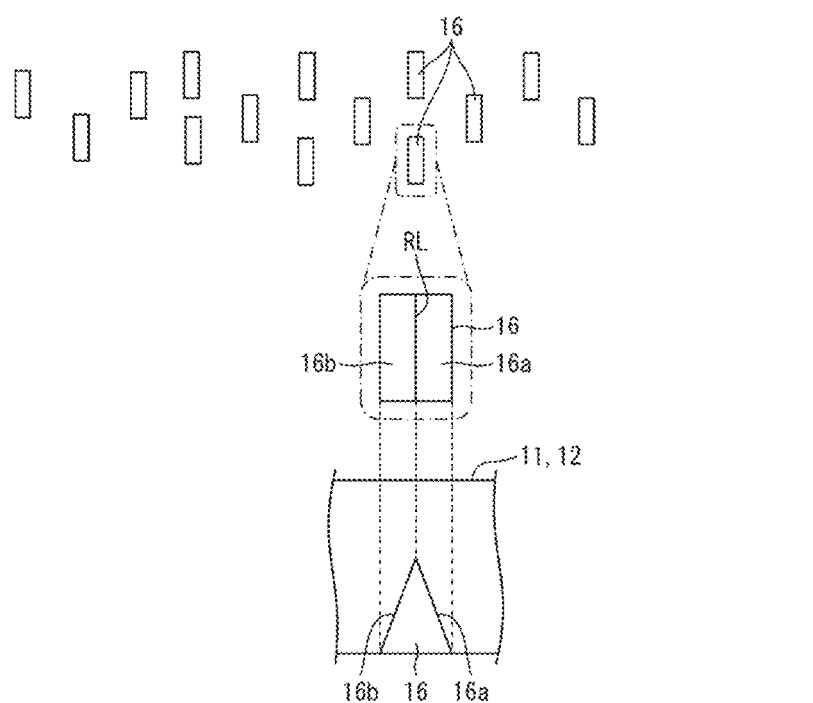
FIG. 3 is a diagram illustrating dimples formed on a first light guide plate and a second light guide plate in a light guide plate unit.

Next, the configuration of the light guide plate unit 10 will be described with reference to FIGS. 1 and 3. FIG. 1 is a schematic diagram illustrating the configuration of the light guide plate unit 10 according to the embodiment. FIG. 3 is a diagram illustrating the dimples 16 formed on the first light guide plate 11 and the second light guide plate 12 in the light guide plate unit 10.

As shown in FIG. 1, the light guide plate unit 10 includes the first light guide plate 11 and the second light guide plate 12 disposed to face each other and a light source substrate 13. The first light guide plate 11 and the second light guide plate 12 include a transparent resin such as acrylic resin and are disposed in the same area when viewed from the front surface of the game machine 1. In the embodiment, the first light guide plate 11 and the second light guide plate 12 are disposed at a distance of, for example, 1 mm. The light guide plate unit 10 is installed such that the second light guide plate 12 faces the glass plate 4 (see FIG. 2) and the first light guide plate 11 faces the image display device 3 (see FIG. 2). That is, an upper side in FIG. 1 is a light emitting side (front side of the game machine 1) facing a player. Hereinafter, each surface of the first light guide plate 11 and the second light guide plate 12 on the light emitting side is also referred to as a light exit surface, and the opposite side thereof is also referred to as a reverse surface.

The light source substrate 13 is provided on one end of the first light guide plate 11 and the second light guide plate 12. The light source substrate 13 has the first light source unit 14 and the second light source unit 15 at positions facing end surfaces 11a and 12a of the first light guide plate 11 and the second light guide plate 12, respectively. In the first light source unit 14 and the second light source unit 15, a plurality of light sources such as light emitting diodes (LEDs) is arranged side by side along a longitudinal direction of the end surfaces 11a and 12a. A controller 20 is connected to this light source substrate 13, and the controller 20 controls lighting (timing, emission color, and the like) of the first light source unit 14 and the second light source unit 15.

In the first light guide plate 11 and the second light guide plate 12, the design part that emits light by emitting the light of the first light source unit 14 and the second light source unit 15 introduced inside to the outside is formed with the light emitter. In the embodiment, the design part has an uneven shape, and specifically, the design part is formed with the dimples 16 as microrecesses (light emitter) formed on the reverse surfaces of the first light guide plate 11 and the second light guide plate. As shown in FIG. 3, the dimples 16 have a V-shaped cross section having a ridge line RL, and V-shaped slopes 16a and 16b serve as reflection surfaces. The ridge line RL is, for example, a line parallel to the end surfaces 11a and 12a of the first light guide plate 11 and the second light guide plate 12. The dimples 16 are arranged in a staggered pattern, for example, so as to be difficult to visually recognize.

This light guide plate unit 10 performs light emitting display in which the light of the first light source unit 14 and the second light source unit 15 introduced inside the first light guide plate 11 and the second light guide plate 12 is reflected at the design part formed with the dimples 16 and emitted to the outside, and the design part shines in the colors of the first light source unit 14 and the second light source unit 15. The designs (patterns) of the design parts of the first light guide plate 11 and the second light guide plate 12 are different, and thus different designs can be emitted and displayed on each of the first light guide plate 11 and the second light guide plate 12. Further, by using different emission colors on the first light source unit 14 and the second light source unit 15 or changing the emission colors of the first light source unit 14 and the second light source unit 15, different designs can be emitted and displayed in different colors.

(3. Prevention of Interference Fringes of Light Guide Plate Unit 10)

Figure 4A:
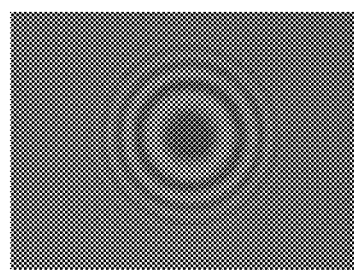
FIG. 4A is a diagram illustrating a Newton ring as a kind of interference fringes.

Next, preventing interference fringes of the light guide plate unit 10 will be described with reference to FIGS. 1, 4(a) to 4(c), and 5. First, interference fringes will be described with reference to FIGS. 4(a) and 4(b). FIG. 4(a) is a view of a Newton ring as a kind of interference fringes, and FIG. 4(b) is a diagram illustrating a dimensional relationship in which a Newton ring occurs.

Figure 4B:
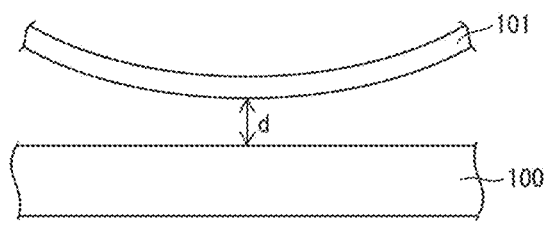
FIG. 4B is a diagram illustrating a dimensional relationship in which a Newton ring occurs.

As shown in FIG. 4(b), one of two light transmission plates 100 and 101 that transmit visible light has a curvature, and when a separation distance d of the closest part between the light transmission plates 100 and 101 is equal to or less than the occurrence distance, rainbow-colored interference fringes due to a Newton ring as shown in FIG. 4(a) are visually recognized. The Newton ring includes a plurality of rings that extends concentrically around the closest part.

When at least one of the first light guide plate 11 or the second light guide plate 12 is warped and the distance between the first light guide plate 11 and the second light guide plate 12 is equal to or less than the occurrence distance, interference fringes due to the Newton ring are visually recognized as shown in FIG. 4(b). The first light guide plate 11 and the second light guide plate 12, which are resin molded products including acrylic resin or the like as a material, are difficult to avoid warp due to an influence of humidity and heat. The occurrence distance with a wavelength of visible light as one parameter varies slightly depending on the curvature due to warp, but the Newton ring can be possibly visually recognized when the occurrence distance is equal to or less than 4.25 µm.

Therefore, in the light guide plate unit 10 according to the embodiment, the microprojection group including the plurality of microprojections 17 is provided in at least one visual recognition region of the first light guide plate 11 or the second light guide plate 12 (see FIG. 1). The microprojection group is provided for ensuring such a distance that interference fringes are not visually recognized between the first light guide plate 11 and the second light guide plate 12 even when the first light guide plate 11 and the second light guide plate 12 are warped.

Figure 5:
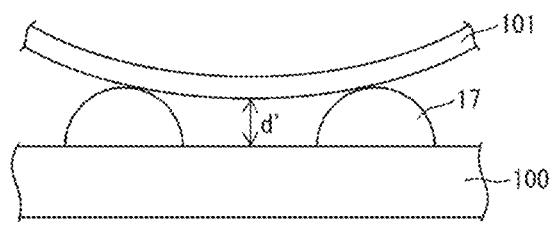
FIG. 5 is a diagram illustrating a dimensional relationship for preventing a Newton ring from occurring due to microprojections.

As shown in FIG. 1, in the embodiment, the plurality of microprojections 17 is formed on the surface of the second light guide plate 12 facing the first light guide plate 11, that is, on the reverse surface. As shown in FIG. 5, these microprojections 17 have a height and an arrangement that can secure a separation distance d' of a closest part located between two adjacent microprojections 17 when the two adjacent microprojections 17 contact a warped light transmission plate 101, the separation distance d' being greater than the occurrence distance. FIG. 5 is a diagram illustrating a dimensional relationship for preventing a Newton ring from occurring due to the microprojections 17.

In the embodiment, the microprojections 17 are dispersed on the entire reverse surface of the second light guide plate 12 including the visual recognition region. It is therefore possible to reliably prevent the interference fringes from being visually recognized in the visual recognition region.

The height of the microprojections 17 is preferably 5 µm or more and 100 µm or less in order to keep the separation distance between the first light guide plate 11 and the second light guide plate 12 larger than the occurrence distance (4.25 µm). The number of microprojections 17 is preferably from 10 to 200 per 1 cm$^2$ inclusive. A bottom area of one microprojection 17 is preferably from 1,000 µm$^2$ to 60,000 µm$^2$ inclusive.

By providing 10 to 200 microprojections 17 per 1 cm$^2$, gaps between the microprojections 17 can be made appropriate and a distance at which interference fringes are not visually recognized can be effectively secured. Further, by setting the height of the microprojections 17 to 5 µm or more and 100 µm or less, the height of the microprojections 17 can be made appropriate, and a distance at which interference fringes are not visually recognized can be effectively secured. By setting the bottom area of one microprojection to 1,000 µm$^2$ or more and 60,000 µm$^2$ or less, the bottom area of each microprojection 17 is made appropriate, the effect of the microprojections such as ensuring a distance where interference fringes are not visually recognized is maintained, and the interference fringes are difficult to visually recognize.

Specifically, an amount of warp to be generated are different depending on a resin material configuring the first light guide plate 11 and the second light guide plate 12, a plate thickness, and the like. However, by setting the height of the microprojections 17 to equal to or more than 5 µm and setting the number of the microprojections 17 to 10 to 200 per 1 cm$^2$, the separation distance d' (see FIG. 5) can be secured larger than the occurrence distance. If the number of the microprojections 17 is smaller than 10 per 1 cm$^2$, a space between adjacent microprojections 17 becomes excessively wide, and the distance may be equal to or less than the occurrence distance. Further, if the number exceeds 200 per 1 cm$^2$, the number is excessively large and wasteful, and the visibility may be impaired. If the height of the microprojections 17 exceeds 100 µm, the height may be unnecessarily high and the visibility may be impaired.

Further, by setting the bottom area of one microprojection 17 to 1,000 µm$^2$ to 60,000 µm$^2$ inclusive, both strength and visibility can be satisfied. That is, if the bottom area is less than 1,000 µm$^2$, a required strength may not be obtained. Further, if the bottom area exceeds 60,000 µm$^2$, interference fringes are visually recognized easily even if the microprojections 17 include the same transparent resin material as the second light guide plate 12.

Further, more preferable conditions are that the height of the microprojections 17 is 5 µm or more and 30 µm or less, the number of microprojections 17 is 10 or more and 50 or less per 1 cm$^2$, and the bottom area of one microprojection 17 is from 1,000 µm$^2$ to 15,000 µm$^2$ inclusive. In short, the microprojections 17 configuring the microprojection group are preferably smaller in size and smaller in number so as not to be visually recognized easily within a range of achieving a function of preventing interference fringes.

Figure 6A:
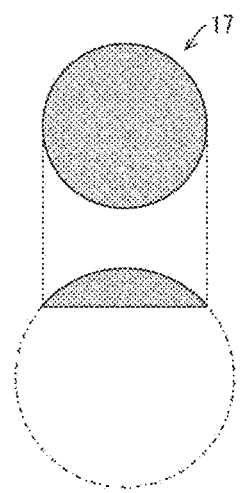
FIGS. 6A, 6B and 6C are diagrams illustrating shapes of microprojections.
Figure 6B:
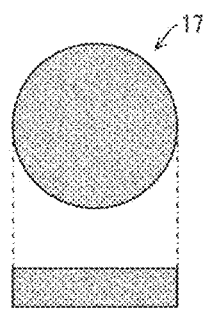
Figure 6C:
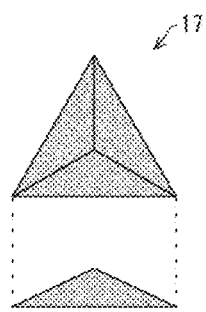

Further, the visibility of the microprojections 17 can be reduced by devising the shape of the microprojections 17. FIGS. 6(*a*) to 6(*c*) are diagrams showing the shapes of the microprojections 17. Specifically, FIG. 6(*a*) is a plan view and a side view of the microprojection 17 having a shape obtained by cutting off an upper part of a sphere, and FIG. 6(*b*) is a plan view and a side view of the microprojection 17 having a cylindrical shape. FIG. 6(*c*) is a plan view and a side view of the microprojections 17 having a triangular pyramid shape.

As shown in FIGS. 6(*a*) to 6(*c*), the shape of the microprojections 17 can be, for example, a shape obtained by cutting off an upper part of a sphere, a cylindrical shape, or a triangular pyramid shape. Such a shape can reduce the visibility of the microprojections 17 as compared with a case where the shape of the microprojections 17 is a rectangular parallelepiped shape. The shape obtained by cutting off an upper part of a sphere includes a hemisphere, and the pyramid such as a triangular pyramid shape includes a conical shape.

Figure 7:
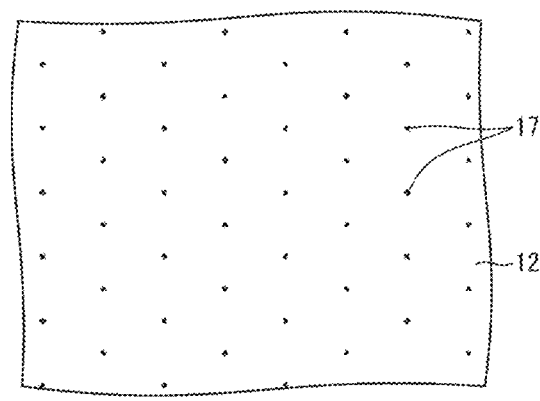
FIG. 7 is a diagram illustrating an example in which microprojections formed on a second light guide plate are arranged in a staggered pattern.

Further, the microprojections 17 are preferably arranged in a staggered pattern or a random pattern as shown in FIG. 7. FIG. 7 is a diagram showing an example in which the microprojections 17 are arranged in a staggered pattern. With the arrangement in a staggered pattern, moire as a kind of interference fringes occurs, but the microprojections 17 are difficult to visually recognize. Further, the microprojections 17 arranged in a random pattern are easier to visually recognize than in a staggered pattern but do not cause moire.

Figure 8:
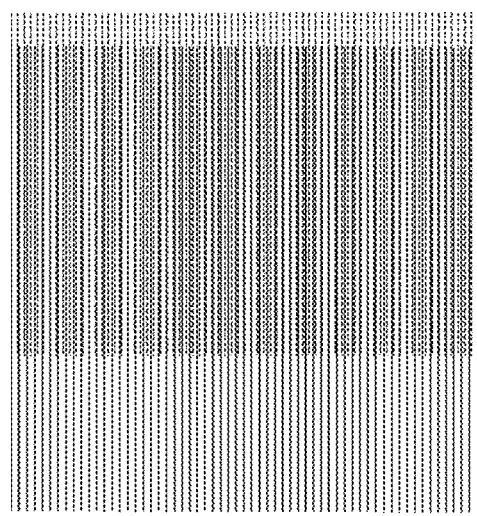
FIG. 8 is a diagram illustrating moire generated between dotted lines and straight lines.

FIG. 8 is a diagram illustrating moire generated between dotted lines and straight lines. As shown in FIG. 8, moire refers to a striped pattern that visually occurs due to a deviation of a period when there is a plurality of periodic patterns having different intervals. In FIG. 8, dark parts are where moire occurs.

Pixels of the microprojections 17, the dimples 16, and the image display device 3, which are small dotted lights, all form dotted lines. Thus, when the plurality of microprojections 17 is regularly arranged, moire occurs between the plurality of microprojections 17 and the plurality of pixels of the plurality of dimples 16 formed on the first light guide plate 11 and the second light guide plate 12 and the plurality of microprojections 17 and the image display device 3. Such moire occurs regardless of the warp of the first light guide plate 11 or the second light guide plate 12. However, even if moire occurs, moire does not impair visibility as long as the moire does not cause a visual problem.

Further, even if the microprojections 17 are regularly arranged, moire can be prevented from occurring by reducing a density of the microprojections 17. Therefore, the density of the microprojections 17 may be set low within a range in which the separation distance d' (see FIG. 5) between the first light guide plate 11 and the second light guide plate 12 can be secured larger than the occurrence distance.

(4. Positional Relationship Between Microprojections 17 and Dimples 16)

Figure 9:
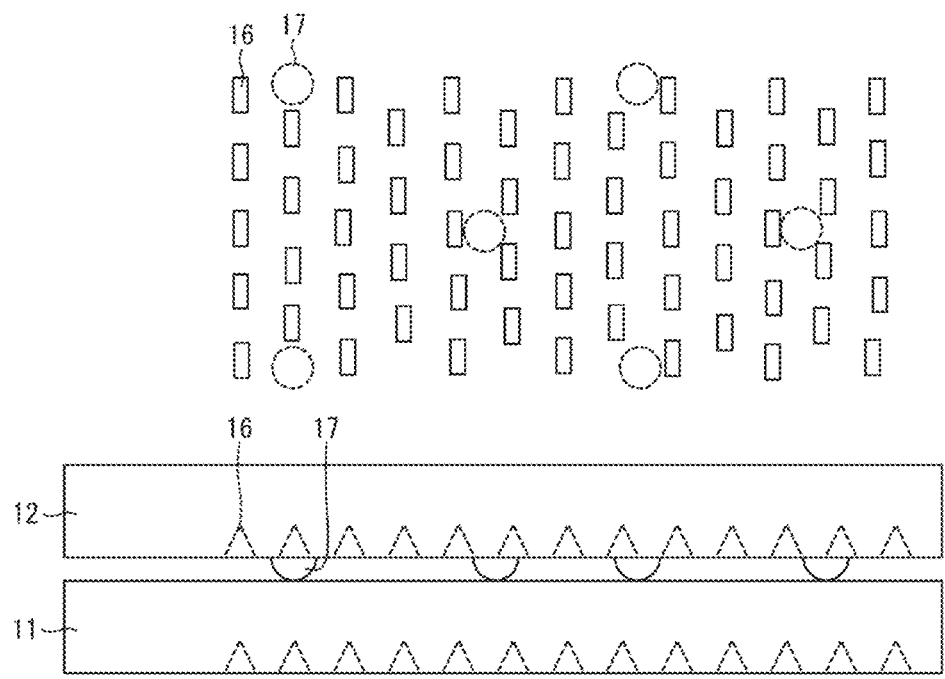
FIG. 9 is a diagram illustrating a positional relationship between a plurality of microprojections and a plurality of dimples formed on a reverse surface of a second light guide plate in a light guide plate unit.

FIG. 9 is a diagram illustrating a positional relationship between the plurality of microprojections 17 and the plurality of dimples 16 formed on the reverse surface of the second light guide plate 12 in the light guide plate unit 10. As shown in FIG. 9, in the light guide plate unit 10, the microprojections 17 and the dimples 16, which are formed on the same surface, are aligned (arranged) so as not to interfere with each other. In a case where the microprojections 17 and the dimples 16 are formed on different surfaces, for example, the microprojections 17 are formed on the light exit surface of the first light guide plate 11, misalignment that occurs when the first light guide plate 11 and the second light guide plate 12 are installed affects the arrangement of the microprojections 17 and the dimples 16. However, by forming the microprojections 17 and the dimples 16 on the same surface in this way, misalignment after processing does not occur. Therefore, when the first light guide plate 11 and the second light guide plate 12 are installed facing each other, high position accuracy is not required, and the manufacturing cost can be reduced.

(5. Influence of Microprojections 17)

In such a configuration, the light reflected by the dimples 16 of the first light guide plate 11 travels in a direction close to a normal direction of the light exit surface of the first light guide plate 11 (see FIG. 1). Then, a part of the light passes through the second light guide plate 12 via the microprojections 17 formed on the reverse surface of the second light guide plate 12 and is visually recognized by the player. Further, of the light traveling inside the second light guide plate 12, the light entering the microprojections 17 in a non-design part where the dimples 16 are not formed does not travel in a direction of the player's eyes because even if the light breaks a condition of total reflection and is emitted to the outside, the light exits to a reverse side. Therefore, the light cannot be visually recognized by the player, and effects of the microprojections 17 to the light emission display do not cause a trouble.

(6. Method for Manufacturing Second Light Guide Plate 12)

Figure 10A:
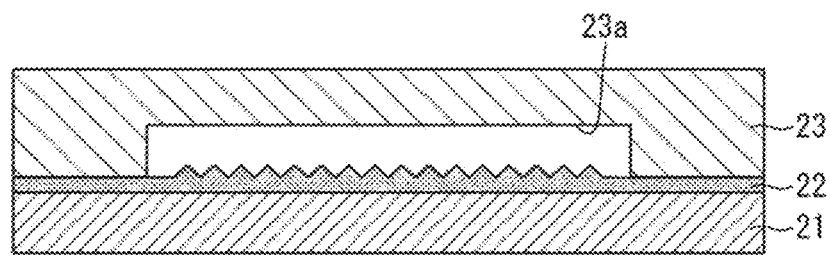
FIGS. 10A, 10B, and 10C are sectional view diagrams illustrating a step of resin-molding a second light guide plate.
Figure 10B:
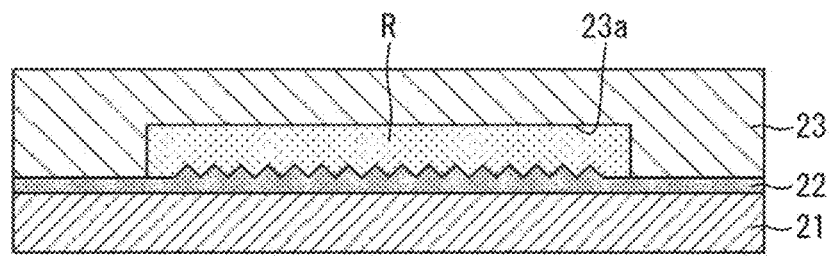
Figure 10C:
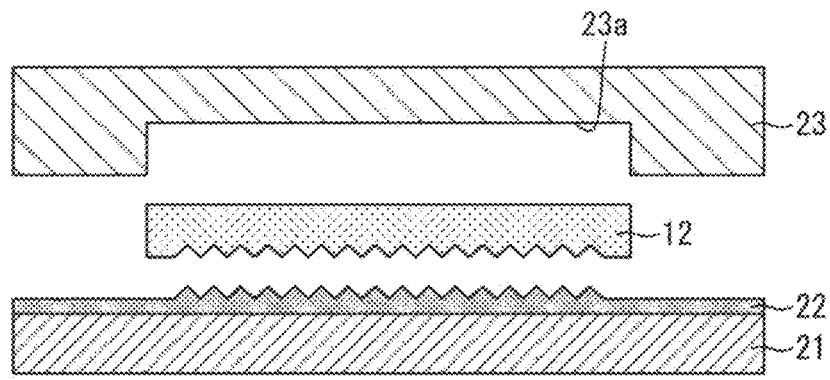

Next, a manufacture of the second light guide plate 12 in the light guide plate unit 10 according to the embodiment will be described. FIGS. 10(a) to 10(c) are sectional views illustrating a step of resin-molding the second light guide plate 12. As shown in FIG. 10(a), a stamper 22 is placed on a fixed mold 21, and a movable mold 23 having a recess 23a is placed over the stamper 22 to fasten the movable mold 23 and the fixed mold 21 together. The stamper 22 is an electroforming mold for forming the dimples 16 and the microprojections 17 of the second light guide plate 12, and provided with inverted protrusions of the dimples 16 and inverted recesses of the microprojections 17. Next, as shown in FIG. 10(b), a resin R is injected into the recess 23a of the movable mold 23 to solidify the resin R. After that, as shown in FIG. 10(c), the movable mold 23 and the fixed mold 21 are separated. As a result, the second light guide plate 12 as a resin product can be obtained.

Figure 11:
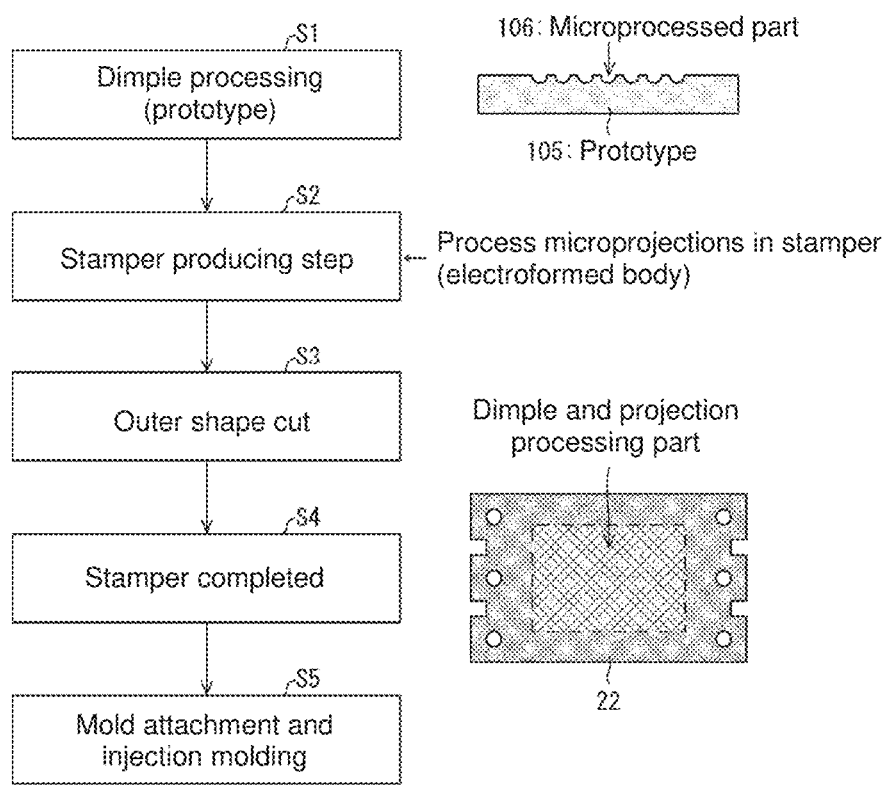
FIG. 11 is a step chart illustrating a step of manufacturing a second light guide plate.
Figure 12:
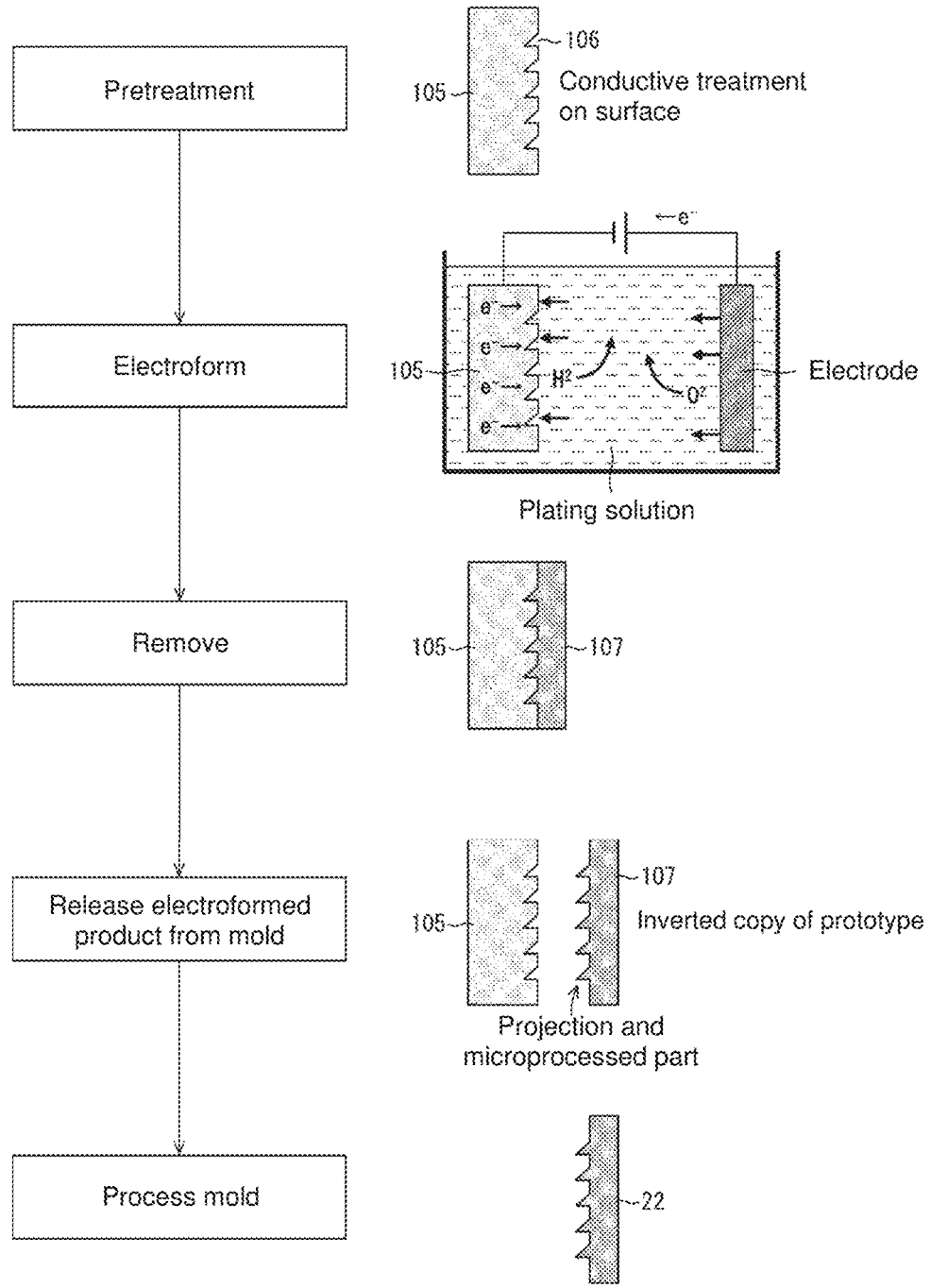
FIG. 12 is an explanatory diagram illustrating an electroforming process of manufacturing a stamper.

FIG. 11 is a step chart illustrating a step of manufacturing the second light guide plate 12. FIG. 12 is an explanatory diagram of an electroforming process of manufacturing the stamper 22. As shown in FIG. 11, first, a prototype 105 is produced (S1), the prototype 105 having a surface on which a microprocessed part 106 corresponding to the dimples 16 is processed. Next, a stamper body 107 is produced by plating using this prototype 105 (S2). Specifically, metal is deposited on the surface on which the microprocessed part 106 is formed by the electroforming process. Note that the prototype 105 may include resin or metal.

In the electroforming process, as shown in FIG. 12, the surface of the prototype 105 is subjected to a conductive treatment, and then the prototype 105 is immersed in a plating solution. Thus, metal is deposited on the surface of the prototype 105 on which the microprocessed part 106 is formed. When a film thickness of the metal reaches a predetermined amount, the prototype 105 is removed, and the prototype 105 and the stamper body (electroformed body) 107 are separated. As a result, the stamper body 107 is in a state of being inverted and copied with respect to the unevenness of the prototype 105, and can be used as a stamper for forming the dimples 16 (first step).

Next, the inverted recesses of the microprojections 17 are processed on a surface of the stamper body 107 formed in this way, the surface having the inverted protrusions of the dimples 16 (second step). As a result, the inverted protrusions of the dimples 16 and the inverted recesses of the microprojections 17 are formed on one surface of the stamper body 107.

After that, an outer shape of the stamper body 107 is cut into a predetermined shape (S3), and the stamper 22 is completed (S4). The stamper 22 thus formed is attached to the above fixed mold 21 (see FIG. 10(a)).

Once this stamper 22 is produced, a duplicate of the stamper 22 can be manufactured by an electroforming process, and thus a plurality of stampers 22 can be easily produced. Moreover, in a case where the microprojections 17 and the dimples 16 are formed on different surfaces, the inverted recesses of the microprojections 17 have to be directly formed in the recesses 23a of the movable mold 23 because the stampers cannot be used on both sides. A manufacturing method of directly processing the mold is costly, and in order to change an arrangement pattern of the microprojections 17, the movable mold 23 has to be newly produced, which is extremely costly.

On the other hand, by providing the microprojections 17 on the same surface as the surface on which the dimples 16 are formed in this way, it is possible to manufacture and obtain, at a lower cost, a light emitting display device in which interference fringes can be reliably prevented from being visually recognized in the visual recognition region even if both or either of the first light guide plate 11 and/or the second light guide plate 12 are warped.

In the embodiment, the configuration including the first light guide plate 11 and the second light guide plate 12 is illustrated, but the configuration may include three or more light guide plates. Further, the microprojections 17 may be provided on the opposing surfaces of both the first light guide plate 11 and the second light guide plate 12. In that case, by providing the dimples 16 in the first light guide plate 11 on the light exit surface, similar effect can be obtained in terms of cost. However, by providing the design part formed with the dimples 16 on the reverse surface, light can be emitted in a direction close to a normal direction of the light exit surfaces of the first light guide plate 11 and the second light guide plate 12. As a result, the light travels toward the player located in front of the game machine 1, and the light can be strong enough to be visually recognized by the player easily. Therefore, in the configuration including the first light guide plate 11 and the second light guide plate 12, as shown in FIG. 1, a combination of the dimples 16 and the microprojection 17 is preferably formed on the reverse surface of the second light guide plate 12 disposed on the light emitting side of the two light guide plates.

<Modification 1>

Figure 13:
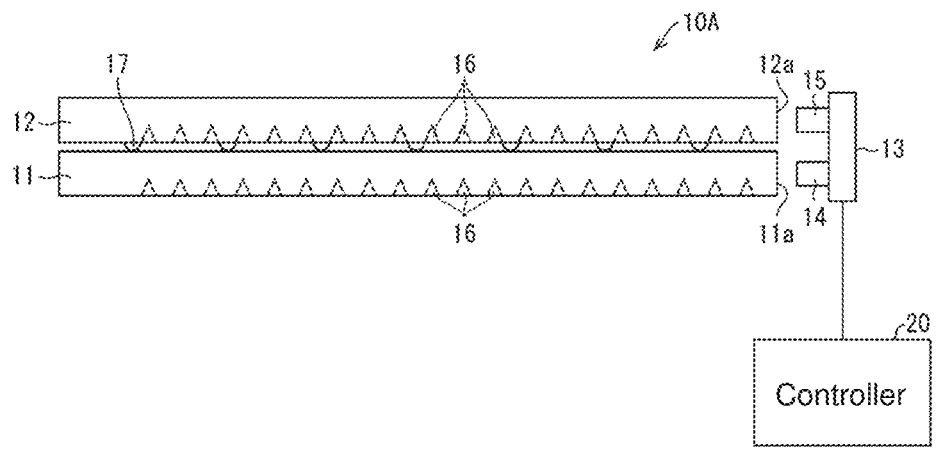
FIG. 13 is a schematic diagram illustrating a configuration of a light guide plate unit according to Modification 1 of a first embodiment.

FIG. 13 is a schematic diagram illustrating a configuration of a light guide plate unit 10A according to Modification 1 of the embodiment. In the light guide plate unit 10, the first light guide plate 11 and the second light guide plate 12 are disposed apart from each other. On the other hand, in the light guide plate unit 10A, the first light guide plate 11 and the second light guide plate 12 are in contact with each other via the plurality of microprojections 17 formed on the reverse surface of the second light guide plate 12. That is, tips of the plurality of microprojections 17 are in contact with the reverse surface of the first light guide plate 11 from the beginning. Note that the configuration other than this configuration is the same as the configuration of the light guide plate unit 10.

<Modification 2>

Figure 14:
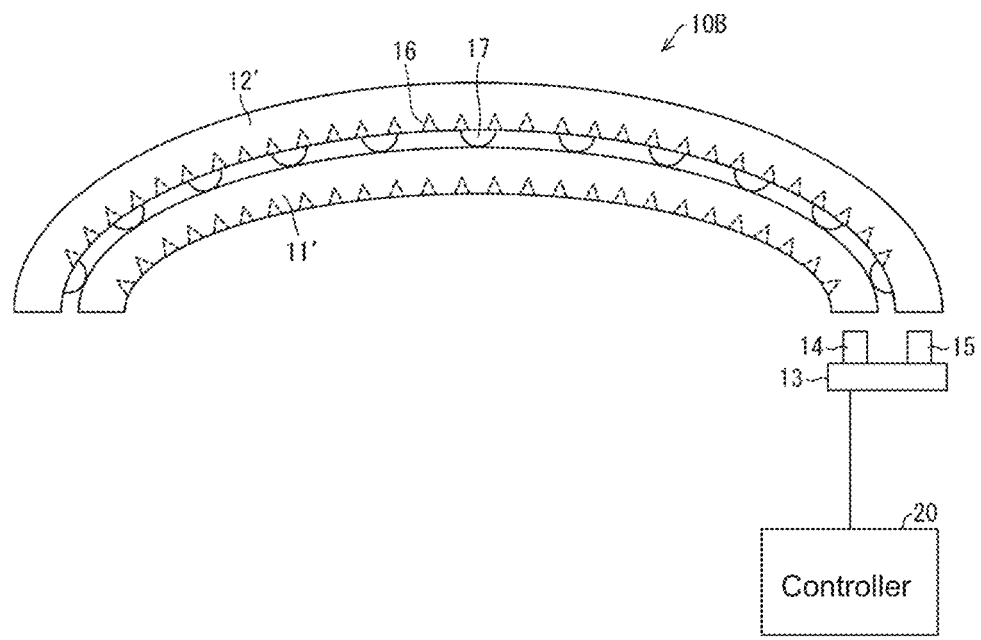
FIG. 14 is a schematic diagram illustrating a configuration of a light guide plate unit according to Modification 2 of a first embodiment.

FIG. 14 is a schematic diagram illustrating a configuration of a light guide plate unit 10B according to Modification 2 of the embodiment one or more embodiments. In the light guide plate units 10 and 10A described above, the first light guide plate 11 and the second light guide plate 12 have a flat plate shape. On the other hand, in the light guide plate unit 10B, a first light guide plate 11' and a second light guide plate 12' that are curved are used instead of the first light guide plate 11 and the second light guide plate 12, respectively.

The example shown in FIG. 14 illustrates a configuration in which the first light guide plate 11' and the second light guide plate 12' are provided instead of the first light guide plate 11 and the second light guide plate 12 of the light guide plate unit 10A of Modification 1. The first light guide plate 11' and the second light guide plate 12' may be provided instead of the first light guide plate 11 and the second light guide plate 12 of the light guide plate unit 10.

Even with a configuration including the first light guide plate 11' and the second light guide plate 12' that are curved as described above, interference fringes may be reliably prevented from being visually recognized in the visual recognition region by providing the microprojection group including the plurality of microprojections 17 in the visual recognition region between the first light guide plate 11' and the second light guide plate 12'.

Second Embodiment

Another embodiment of the disclosure will be described below with reference to FIG. 15. For convenience of explanation, members having the same functions as the members shown in the drawings of a first embodiment are designated by the same symbols, and the description thereof will be omitted.

Figure 15:
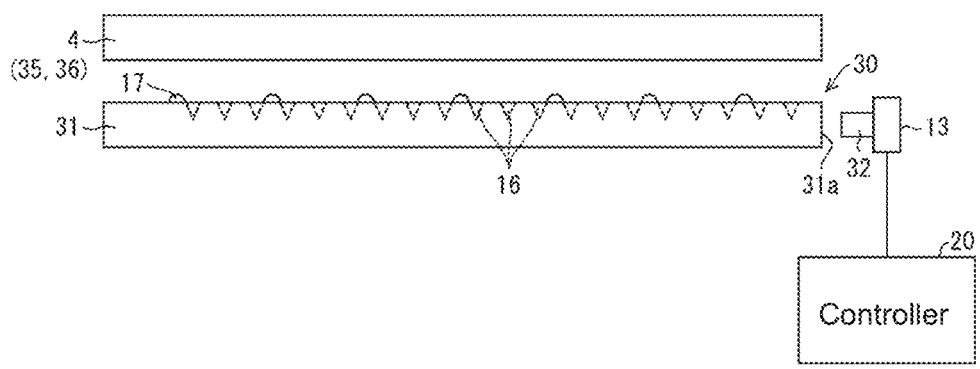
FIG. 15 is a schematic diagram illustrating a configuration of a light guide plate unit according to a second embodiment.

FIG. 15 is a schematic diagram illustrating a configuration of a light guide plate unit 30 according to the embodiment. As shown in FIG. 15, the light guide plate unit 30 includes at least one light guide plate 31. The light guide plate 31 has the design part formed by the dimples 16 and the microprojections 17 on a light exit surface. The light source substrate 13 has a light source unit 32 at a position facing an end surface 31a of the light guide plate 31.

FIG. 15 illustrates a configuration including one light guide plate 31, but the configuration may include a plurality of light guide plates as shown in the light guide plate units 10 to 10C described in a first embodiment. In that case, the light guide plate 31 corresponds to the light guide plate located closest to the light emitting side.

The light guide plate 31 is disposed to face and be close to the glass plate 4 (see FIG. 2). When this light guide plate 31 is warped and the separation distance from the glass plate 4 becomes equal to or less than the occurrence distance, interference fringes (Newton ring) occur between the light guide plate 31 and the glass plate 4.

Thus, in the light guide plate unit 30, the plurality of microprojections 17 is formed on the light exit surface (a surface facing the glass plate 4) of the light guide plate 31 located closest to the light emitting side facing the glass plate 4. That is, the light guide plate unit 30 includes the microprojection group including the plurality of microprojections 17 provided in the visual recognition region of the light guide plate 31, the microprojection group having a height and an arrangement that secures a distance so as not to contact the glass plate 4 as an object facing the light guide plate 31 and cause interference fringes to be visually recognized between the light guide plate 31 and the glass plate 4. As a result, even when the light guide plate 31 is warped, it is possible to reliably prevent interference fringes (Newton ring) from occurring and being visually recognized in the visual recognition region between the light guide plate 31 and the glass plate 4.

In the configuration shown in FIG. 15, the glass plate 4 of the game machine 1 is illustrated as a light transmission plate that is disposed to face the light guide plate unit 30 and transmits visible light that may cause interference fringes. However, in an application to a guidance apparatus, a signboard apparatus, or the like instead of the game machine 1, a resin plate 35 or the like of a resin case that accommodates the light guide plate unit 30 corresponds to the light transmission plate that may cause interference fringes. Further, it is also possible to install the light guide plate unit 30 on a reverse surface (rear surface) of a liquid crystal panel (equipped with no backlight) or the like. In that case, a liquid crystal panel 36 corresponds to the light transmission plate that causes interference fringes. The light transmission plate (light transmission film) disposed to face a light guide plate unit 40 includes a colored light transmission plate such as an opaque glass, a mirror-deposited light transmission plate such as a semitransparent mirror, and the like.

Third Embodiment

Still another embodiment of the disclosure will be described with reference to FIG. 16. For convenience of explanation, members having the same functions as the members shown in the drawings of a first embodiment are designated by the same symbols, and the description thereof will be omitted.

Figure 16:
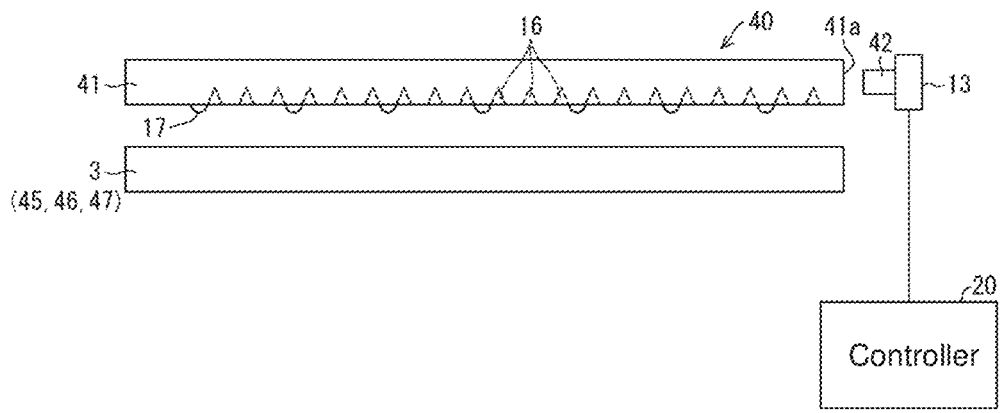
FIG. 16 is a schematic diagram illustrating a configuration of a light guide plate unit according to a third embodiment.

FIG. 16 is a schematic diagram illustrating a configuration of the light guide plate unit 40 according to the embodiment. As shown in FIG. 16, the light guide plate unit 40 includes at least one light guide plate 41. The light guide plate 41 has the design part formed by the dimples 16 and the microprojections 17 on a reverse surface opposite to a light exit surface. The light source substrate 13 has a light source unit 42 at a position facing an end surface 41a of the light guide plate 41.

FIG. 16 illustrates a configuration including one light guide plate 41, but the configuration may include a plurality of light guide plates as shown in the light guide plate units 10 to 10C described in a first embodiment. In that case, the light guide plate 41 corresponds to the light guide plate located in a rear part opposite to the closest side to the light emitting side.

The light guide plate 41 is disposed to face and be close to the image display device 3 (see FIG. 2). When this light guide plate 41 is warped and the separation distance between the light guide plate 41 and a surface of a panel such as a liquid crystal panel of the image display device 3 is equal to or less than the occurrence distance, interference fringes (Newton ring) occur between the light guide plate 41 and the image display device 3.

Thus, in the light guide plate unit 40, the plurality of microprojections 17 is formed on the reverse surface of the light guide plate 41 located at a rearmost position facing the image display device 3 (the surface facing the image display device 3). That is, the light guide plate unit 40 includes the microprojection group including the plurality of microprojections 17 provided in the visual recognition region of the light guide plate 41, the microprojection group having a height and an arrangement that secures a distance so as not to contact the image display device 3 as an object facing the light guide plate 41 and cause interference fringes to be visually recognized between the light guide plate 41 and the image display device 3. As a result, even when the light guide plate 41 is warped, it is possible to reliably prevent interference fringes (Newton ring) from occurring and being visually recognized in the visual recognition region between the light guide plate 41 and the image display device 3.

In the configuration shown in FIG. 16, the image display device 3 of the game machine 1 is illustrated as a light transmission plate that is disposed to face the light guide plate unit 40 and transmits visible light that may cause interference fringes. In an application to a guidance apparatus, a signboard apparatus, or the like instead of the game machine 1, the image display device 45 located in a rear part opposite to the light emitting side corresponds to the light transmission plate that may cause fringes. Further, a layer (film) having a glossy surface such as a photograph 46 and a design panel 47 having a glossy surface also corresponds to the light transmission plate that may cause interference fringes. Further, it is also possible to install the light guide plate unit 40 on a reverse surface (rear surface) of a liquid crystal panel (equipped with no backlight) or the like. In that case, the liquid crystal panel 36 corresponds to the light transmission plate that transmits visible light that may cause interference fringes. The light transmission plate (light transmission film) disposed to face the light guide plate unit 40 includes a colored light transmission plate such as an opaque glass, a mirror-deposited light transmission plate such as a semitransparent mirror, and the like.

SUMMARY

In order to solve the above problems, a light emitting display device according to one aspect of the disclosure includes a light guide plate provided with a plurality of microrecesses that emits light supplied within the light guide plate to outside, a light source unit configured to supply light to the light guide plate, and a microprojection group including a plurality of microprojections provided in a visual recognition region of the light guide plate, the microprojection group having a height and an arrangement that ensure such a distance that interference fringes are not visually recognized in a case where the microprojection group is in contact with an object disposed to face the light guide plate and the object has light transmission property between the light guide plate and the object, in which the microprojection group and the plurality of microrecesses are disposed on an identical surface.

In the above configuration, the microprojection group including the plurality of microprojections provided in the visual recognition region of the light guide plate ensures such a distance that interference fringes are not visually recognized in a case where the microprojection group is in contact with an object disposed to face the light guide plate and the object has light transmission property between the light guide plate and the object.

As a result, even when the light guide plate is warped, it is possible to reliably prevent interference fringes from occurring and being visually recognized in the visual recognition region between the light guide plate and the object. Moreover, in the light guide plate, the microrecesses and the microprojections are formed on the same surface, which produces further effect that a manufacturing cost can be suppressed low and the light guide plate can be manufactured at low cost.

A light emitting display device according to one aspect of the disclosure includes a plurality of light guide plates provided with a plurality of microrecesses that emits light supplied within the plurality of light guide plates to outside, the plurality of light guide plates being disposed to be superimposed on each other in a plan view, a plurality of light source units provided to correspond to the plurality of light guide plates, and a microprojection group including a plurality of microprojections provided in a visual recognition region of at least one of two opposing light guide plates of the plurality of light guide plates, the microprojection group having a height and an arrangement that ensure such a distance that interference fringes are not visually recognized between the two opposing light guide plates in a case where the microprojection group is in contact with another opposing light guide plate, in which the microprojection group and the plurality of microrecesses are disposed on an identical surface.

In the above configuration, the microprojection group including the plurality of microprojections provided in the visual recognition region of the at least one of two opposing light guide plates of the plurality of light guide plates ensures such a distance that interference fringes are not visually recognized between the two opposing light guide plates in a case where the microprojection group is in contact with another opposing light guide plate.

As a result, even when any or all of the plurality of light guide plates are warped, it is possible to reliably prevent interference fringes from occurring and being visually recognized in the visual recognition region between the light guide plates. Moreover, in the light guide plate, the microrecesses and the microprojections are formed on the same surface, which produces further effect that a manufacturing cost can be suppressed low and the light guide plate can be manufactured at low cost. In the light emitting display device according to one aspect of the disclosure, the microprojections are arranged in a staggered or random pattern in the first or second aspect. By arranging the microprojections in a staggered pattern, the microprojections are difficult to visually recognize, and by arranging the microprojections in a random pattern, moire as a kind of interference fringes can be prevented from occurring.

In any of the first to third aspects, the light emitting display device according to one aspect of the disclosure is provided with 10 to 200 microprojections per 1 cm². Thus, gaps of the microprojections can be made appropriate and a distance at which interference fringes are not visually recognized can be effectively secured.

In the light emitting display device according to one aspect of the disclosure, in any of the first to fourth aspects, the height of the microprojections is 5 μm or more and 100 μm or less. Thus, the height of the microprojections can be made appropriate and a distance at which interference fringes are not visually recognized can be effectively secured.

In the light emitting display device according to one aspect of the disclosure, each of the microprojections has a bottom area of 1,000 μm² or more and 60,000 μm² or less in any of the first to fifth aspects. As a result, the bottom area of the microprojections can be made appropriate, the effect of the microprojections of securing a distance at which interference fringes cannot be visually recognized is maintained, and interference fringes are difficult to visually recognize.

A game machine according to one aspect of the disclosure includes the light emitting display device described in any of the first to sixth aspects. Thus, even when the light guide plate of the light emitting display device is warped, the game machine can be obtained in which interference fringes are reliably prevented from occurring and being visually recognized in the visual recognition region between the light guide plate and the object.

A method for manufacturing a light guide plate according to one aspect of the disclosure, the light guide plate being provided with, on one surface of the light guide plate, a plurality of microrecesses that emits light supplied within the light guide plate to outside and a microprojection group including a plurality of microprojections provided in a visual recognition region of the light guide plate, the microprojection group having a height and an arrangement that ensure such a distance that interference fringes are not visually recognized in a case where the microprojection group is in contact with an object disposed to face the light guide plate and the object has light transmission property between the light guide plate and the object, the method including manufacturing a stamper body by electroforming with a prototype provided with the microrecesses in a first step, and processing recesses to be the microprojections, in a second step, on a surface of the stamper body that has been produced in the first step, the surface being provided with inverted products of the microrecesses.

In this configuration, it is possible to obtain a stamper body in which the microprojections and the microrecesses are formed by electroforming and to obtain a light guide plate in which the microrecesses and the microprojections are on the same surface. It is therefore possible to manufacture the mold without directly processing the mold, as in a case where the microrecesses and the microprojections are on different surfaces, and to manufacture the mold at low cost.

The invention is not limited to the embodiments described above, and various modifications can be made within the scope of the claims, and embodiments obtained by appropriately combining the technical means disclosed in the different embodiments are also included in the technical scope of the invention.

DESCRIPTION OF SYMBOLS 1 game machine
2 game area
3, 45 image display device
4 glass plate (object)
5 handle
6 upper tray
7 lower tray
10, 10A, 10B light guide plate unit (light emitting display device)
30, 40 light guide plate unit (light emitting display device)
11, 11' first light guide plate
12, 12' second light guide plate
13 light source substrate
14 first light source unit
15 second light source unit
16 dimple (light emitter)
17 microprojection (microprojection group)
20 controller
31, 41 light guide plate
32, 42 light source unit
35 resin plate (object)
36 liquid crystal panel (object)
46 photograph (object)
47 design panel (object)
105 prototype
106 microprocessed part
107 stamper body

The invention claimed is:

1. A light emitting display device comprising:
a light guide plate comprising a plurality of microrecesses that emits light supplied within the light guide plate to outside;
a light source unit configured to supply light to the light guide plate; and
a microprojection group comprising a plurality of microprojections formed on the light guide plate and provided in a visual recognition region of the light guide plate, the microprojection group having a height and an arrangement that ensure a separation distance between a closest part of the light guide plate to an object between two adjacent microprojections that is greater than an occurrence distance of an occurrence of interference fringes such that the interference fringes are not visually recognized in a case where the microprojection group is in contact with the object positioned to face the light guide plate and light is transmitted between the light guide plate and the object,
wherein the microprojection group and the plurality of microrecesses are arranged on an identical surface.

2. A light emitting display device comprising:
a plurality of light guide plates comprising a plurality of microrecesses that emits light supplied within the plurality of light guide plates to outside, the plurality of light guide plates being arranged to be superimposed on each other in a plan view;
a plurality of light source units provided to correspond to the plurality of light guide plates; and
a microprojection group comprising a plurality of microprojections formed on one of two opposing light guide plates of the plurality of light guide plates and provided in a visual recognition region of the at least one light guide plate, the microprojection group having a height and an arrangement that ensure a separation distance between a closest part of the light guide plate to the other of the two opposing light guide plates between two adjacent microprojections that is greater than an occurrence distance of an occurrence of interference fringes such that the interference fringes are not visually recognized between the two opposing light guide plates in a case where the microprojection group is in contact with the other of the two opposing light guide plates, wherein the microprojection group and the plurality of microrecesses are arranged on an identical surface.

3. The light emitting display device according to claim 1, wherein the microprojections are arranged in a staggered or random pattern.

4. The light emitting display device according to claim 1, wherein 10 to 200 of the microprojections are provided per 1 cm$^2$.

5. The light emitting display device according to claim 1, wherein the microprojections have a height of 5 μm or more and 100 μm or less.

6. The light emitting display device according to claim 1, wherein each of the microprojections has a bottom area of 1,000 μm$^2$ or more and 60,000 μm$^2$ or less.

7. A game machine comprising the light emitting display device according to claim 1.

8. A method for manufacturing a light guide plate provided with, on one surface of the light guide plate, a plurality of microrecesses that emits light supplied within the light guide plate to outside and a microprojection group formed on the light guide plate and comprising a plurality of microprojections provided in a visual recognition region of the light guide plate, the microprojection group comprising a height and an arrangement that ensure a separation distance between a closest part of the light guide plate to an object between two adjacent microprojections that is greater than an occurrence distance of an occurrence of interference fringes such that the interference fringes are not visually recognized in a case where the microprojection group is in contact with the object disposed to face the light guide plate and light is transmitted between the light guide plate and the object, the method comprising:
manufacturing a stamper body by electroforming with a prototype provided with the microrecesses; and processing recesses to be the microprojections on a surface of the manufactured stamper body, the surface being provided with inverted products of the microrecesses.

9. The light emitting display device according to claim 2, wherein the microprojections are arranged in a staggered or random pattern.

10. The light emitting display device according claim 2, wherein 10 to 200 of the microprojections are provided per 1 cm$^2$.

11. The light emitting display device according to claim 3, wherein 10 to 200 of the microprojections are provided per 1 cm$^2$.

12. The light emitting display device according to claim 2, wherein the microprojections have a height of 5 μm or more and 100 μm or less.

13. The light emitting display device according to claim 3, wherein the microprojections have a height of 5 μm or more and 100 μm or less.

14. The light emitting display device according to claim 4, wherein the microprojections have a height of 5 μm or more and 100 μm or less.

15. The light emitting display device according to claim 2, wherein each of the microprojections has a bottom area of 1,000 μm$^2$ or more and 60,000 μm$^2$ or less.

16. The light emitting display device according to claim 3, wherein each of the microprojections has a bottom area of 1,000 μm$^2$ or more and 60,000 μm$^2$ or less.

17. The light emitting display device according to claim 4, wherein each of the microprojections has a bottom area of 1,000 μm$^2$ or more and 60,000 μm$^2$ or less.

18. The light emitting display device according to claim 5, wherein each of the microprojections has a bottom area of 1,000 μm$^2$ or more and 60,000 μm$^2$ or less.

19. A game machine comprising the light emitting display device according to claim 2.

20. A game machine comprising the light emitting display device according to claim 3.

* * * * *